(12) United States Patent
Lee

(10) Patent No.: US 10,769,768 B1
(45) Date of Patent: Sep. 8, 2020

(54) APPARATUS AND METHOD FOR PROVIDING APPLICATION SERVICE USING SATELLITE IMAGE

(71) Applicant: CONTEC CO., LTD., Daejeon (KR)

(72) Inventor: Sunghee Lee, Sejong-si (KR)

(73) Assignee: CONTEC CO., LTD., Daejeon (KR)

( * ) Notice: Subject to any disclaimer, the term of this patent is extended or adjusted under 35 U.S.C. 154(b) by 0 days.

(21) Appl. No.: 16/835,229

(22) Filed: Mar. 30, 2020

Related U.S. Application Data

(63) Continuation of application No. PCT/KR2019/005502, filed on May 8, 2019.

(30) Foreign Application Priority Data

May 7, 2019 (KR) .................. 10-2019-0053145

(51) Int. Cl.
*G06T 7/00* (2017.01)
*G06K 9/00* (2006.01)
*G06K 9/20* (2006.01)
*G06Q 30/04* (2012.01)

(52) U.S. Cl.
CPC .......... *G06T 7/0002* (2013.01); *G06K 9/0063* (2013.01); *G06K 9/00671* (2013.01); *G06K 9/2081* (2013.01); *G06Q 30/04* (2013.01); *G06T 2207/10032* (2013.01); *G06T 2207/20104* (2013.01)

(58) Field of Classification Search
CPC ......... G06T 7/0002; G06T 2207/20104; G06T 2207/10032; G06K 9/0063; G06K 9/2081; G06K 9/00671; G06Q 30/04
See application file for complete search history.

(56) References Cited

U.S. PATENT DOCUMENTS

2018/0239948 A1* 8/2018 Rutschman ............... G06T 7/20
2018/0239982 A1* 8/2018 Rutschman ......... H04N 5/23299
2019/0050625 A1* 2/2019 Reinstein ............ G06K 9/0063

FOREIGN PATENT DOCUMENTS

| KR | 10-2009-0004393 A | 1/2009 |
| KR | 10-2010-0023788 A | 3/2010 |
| KR | 10-2011-0023098 A | 3/2011 |
| KR | 10-2019-0026116 A | 3/2019 |
| KR | 10-2019-0038137 A | 4/2019 |

OTHER PUBLICATIONS

International Search Report issued in PCT/KR2019/005502; dated Feb. 7, 2020.

(Continued)

*Primary Examiner* — Wesley J Tucker
(74) *Attorney, Agent, or Firm* — Studebaker & Brackett PC

(57) ABSTRACT

Provided is an apparatus and method for providing an application service using a satellite image. An application service providing apparatus using a satellite image may include a satellite image information acquirer configured to acquire a satellite image; an object extractor configured to analyze the satellite image, to extract an object from the satellite image, and to generate an object image corresponding to the object; a storage configured to store the satellite image and the object image; and a service processing configured to process a service based on at least one of the satellite image and the object image.

16 Claims, 9 Drawing Sheets

(56) References Cited

OTHER PUBLICATIONS

"Grant of Patent" Office Action issued in KR 10-2019-0053145; mailed by the Korean Intellectual Property Office dated Oct. 25, 2019.
"Notification of Reason for Refusal" Office Action issued in KR 10-2019-0053145; mailed by the Korean Intellectual Property Office dated Jul. 30, 2019.

* cited by examiner

APPARATUS AND METHOD FOR PROVIDING APPLICATION SERVICE USING SATELLITE IMAGE

CROSS-REFERENCE TO RELATED APPLICATION

The present application is a continuation of International Patent Application No. PCT/KR2019/005502, filed on May 8, 2019, which is based upon and claims the benefit of priority to Korean Patent Application No. 10-2019-0053145, filed on May 7, 2019, in the Korean Intellectual Property Office (KIPO). The disclosures of the above-listed applications are hereby incorporated by reference herein in their entirety.

BACKGROUND

1. Field

At least one example embodiment relates to an apparatus and method for providing an application service using a satellite image, and more particularly, to an apparatus and method for providing a satellite image acquired through an artificial satellite or providing a service related to the satellite image.

2. Description of Related Art

An artificial satellite refers to a device that may move in a predetermined circle or an elliptical orbit around the earth. The artificial satellite may perform a variety of tasks in the orbit. For example, the artificial satellite may perform a variety of tasks, such as, relaying wireless communication between two separate points while moving in the orbit or gathering images of the ground surface by capturing images of the ground surface.

In the recent times, a number of artificial satellites being operated all over the world is on the rapid increase. Currently, about 1,600 artificial satellites are orbiting the earth. Also, a number of artificial satellites around the earth are expected to increase as a space market is evolved from government-led development to private-led development. Accordingly, artificial satellite constellation formed accordingly enables an earth observation time and a resolution of image to be enhanced.

Large amounts of data from artificial satellites are widely used in each industry. For example, images of various points acquired from artificial satellites through optics and radars (e.g., military installations, disaster areas, urban areas, forest areas, or mineral resource areas) may be analyzed and processed using various methods and used in many industries.

SUMMARY

At least one example embodiment provides an apparatus and method for providing an application service using a satellite image such that a user desiring to use a satellite image may conveniently use a satellite image-based service without restriction on a time and an occasion, or such that a service provider may further easily and conveniently design, construct, or implement a desired service to provide a satellite image-based service.

According to an aspect of at least one example embodiment, there is provided an apparatus and method for providing an application service using a satellite image.

An apparatus for providing an application service using a satellite image may include a satellite image information acquirer configured to acquire a satellite image; an object extractor configured to analyze the satellite image, to extract an object from the satellite image, and to generate an object image corresponding to the object; a storage configured to store the satellite image and the object image; and a service processing configured to process a service based on at least one of the satellite image and the object image.

The application service providing apparatus may further include an additional information processing configured to acquire additional information corresponding to the object, and to combine the additional information with at least one of the satellite image and the object image.

The service may include at least one of: a service of providing an object image corresponding to a target of interest; a service of providing a result of analyzing an object corresponding to the target of interest; a service of providing additional information corresponding to an area corresponding to a region of interest or the object corresponding to the target of interest; and a service of providing a result of analyzing a difference between a plurality of satellite images captured at different times or a result of performing a time series analysis on a difference between a plurality of object images acquired from the plurality of satellite images.

The service of providing the object image corresponding to the target of interest may be performed by providing the satellite image in response to a request from a user, by receiving a selection of the user on the target of interest in the satellite image, by providing the object image corresponding to the target of interest, and by receiving a determination regarding whether to use the service in response to providing of the object image.

The object extractor may be configured to analyze the satellite image or to extract the object from the satellite image, using at least one machine learning algorithm.

The application service providing apparatus may further include a biller configured to perform billing processing corresponding to providing of the service.

A method of providing an application service using a satellite image may include acquiring a satellite image; analyzing the satellite image, extracting an object from the satellite image, and generating an object image corresponding to the object; storing the satellite image and the object image; and providing a service based on at least one of the satellite image and the object image.

The application service providing method may further include acquiring additional information corresponding to the object, and combining the additional information with at least one of the satellite image and the object image.

The providing of the service may include at least one of: providing an object image corresponding to a target of interest; providing a result of analyzing an object corresponding to the target of interest; providing additional information corresponding to an area corresponding to a region of interest or the object corresponding to the target of interest; and providing a result of analyzing a difference between a plurality of satellite images captured at different times or a result of performing a time series analysis on a difference between a plurality of object images acquired from the plurality of satellite images.

The providing of the object image corresponding to the target of interest may include providing the satellite image in response to a request from a user; receiving a selection of the user on the target of interest in the satellite image; providing the object image corresponding to the target of interest; and receiving a determination regarding whether to use the service in response to providing of the object image.

The analyzing of the satellite image, the extracting of the object, and the generating of the object image may include at least one of: analyzing the satellite image using at least one machine learning algorithm; and extracting the object from the satellite image using the at least one machine learning algorithm.

The application service providing method may further include performing billing processing corresponding to providing of the service.

According to the aforementioned application service providing apparatus and method, a user desiring to use a satellite image may conveniently use a satellite image-based service without restrictions on a time and an occasion.

According to the aforementioned application service providing apparatus and method, it is possible to enhance readiness and convenience for designing, constructing, or implementing various services based on a satellite image and to acquire economical effects coming from cost saving.

According to the aforementioned application service providing system, satellite data providing apparatus, and satellite data providing method, a user may use satellite images if necessary, such as, for example, verifying a change status of a specific area for developing and managing the specific area, monitoring a disaster or a disaster situation, analyzing a space of each area.

According to the aforementioned application service providing system, satellite data providing apparatus, and satellite data providing method, a user may periodically or aperiodically receive and use satellite image data about a desired region of interest or target of interest at a desired point in time.

Other features and aspects will be apparent from the following detailed description, the drawings, and the claims.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
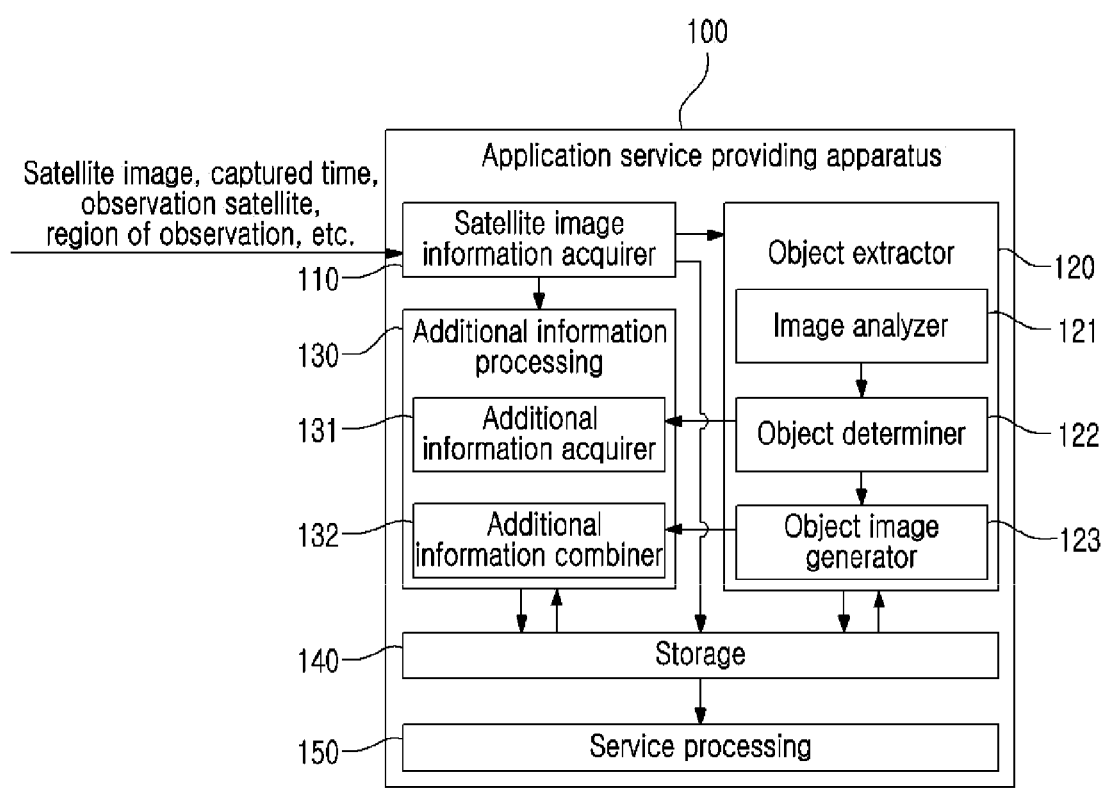
FIG. 1 is a diagram illustrating an example of an apparatus for providing an application service using a satellite image according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Unless the context clearly indicates otherwise, like reference numerals refer to like elements used throughout. Also, components used herein, such as, for example, terms '-unit/module', etc., may be implemented as software and/or hardware. Depending on example embodiments, each component with '-unit/module', etc., may be implemented as a single piece of software, hardware and/or a desired part, and also may be implemented as a plurality of pieces of software, hardware, and/or desired parts.

When it is described that a single portion is connected to another portion throughout the present specification, it may indicate that a single portion is physically connected or electrically connected to to the other portion. Also, when a single portion is described to include the other portion, it may include still another portion instead of excluding still other portion, unless the context clearly indicates otherwise.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component. As used herein, the term "and/or" includes any and all combinations of one or more of the associated listed items.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the related art, and are not to be interpreted in an idealized or overly formal sense unless expressly so defined herein.

Hereinafter, an apparatus (also, referred to as an application service providing apparatus) for providing an application service using a satellite image according to an example embodiment is described with reference to FIGS. 1 to 8.

FIG. 1 is a diagram illustrating an example of an apparatus for providing an application service using a satellite image according to an example embodiment.

Referring to FIG. 1, an application service providing apparatus 100 may include a satellite image information acquirer 110 and a storage 140, and, depending on example embodiments, may further include at least one of an object extractor 120, an additional information processing 130, and a service processing 150.

The satellite image information acquirer 110 may receive and acquire satellite image information. Here, the satellite image information may include image data (hereinafter, a satellite image) about an area (d10 of FIG. 2, hereinafter, a photographing area) captured by an artificial satellite. The satellite image may be a still image or may be a moving picture. Also, depending on example embodiments, the satellite image information may further include at least one piece of relevant information required to provide an application service using the satellite image, such as, for example, a time at which the satellite image is captured, information (e.g., latitude/longitude, global positioning system (GPS) coordinates, Global Orbiting Navigational Satellite System (GLONASS) coordinates or address, etc.) about the capturing area (d10) corresponding to the satellite image, information (e.g., artificial satellite identification number) about the artificial satellite used to capture the satellite image, and/or a resolution of the satellite image. Such relevant information may be received together or sequentially with a corresponding satellite image. For example, the relevant information may be tagged to the satellite image and received.

The satellite image information acquirer 110 may acquire satellite image information several times. In this case, the satellite image information acquirer 110 may periodically acquire the satellite image information or may aperiodically acquire the satellite image information.

According to an example embodiment, the satellite image information acquirer 110 may acquire satellite image information using a communication module. The communication module may include a device capable of receiving an instruction or data from an external device through a wired communication network, a wireless communication network (including a near field communication network, a mobile communication network, etc.), or combination thereof. In this case, the satellite image information acquirer 110 may receive and acquire satellite image information through communication with another apparatus (e.g., an artificial satellite, a space ground station to communicate with the artificial satellite, a satellite image database, etc.). Also, the satellite image information acquirer 110 may include a data input/output module, for example, a universal serial bus (USB) and a thunder bolt. In this case, the satellite image information acquirer 110 may acquire satellite image information from an external memory device (e.g., a portable hard disc and a USB memory).

The satellite information received by the satellite image information acquirer 110 may be forwarded and stored in the storage 140, and, depending on example embodiments, may be forwarded to the object extractor 120.

Figure 2:
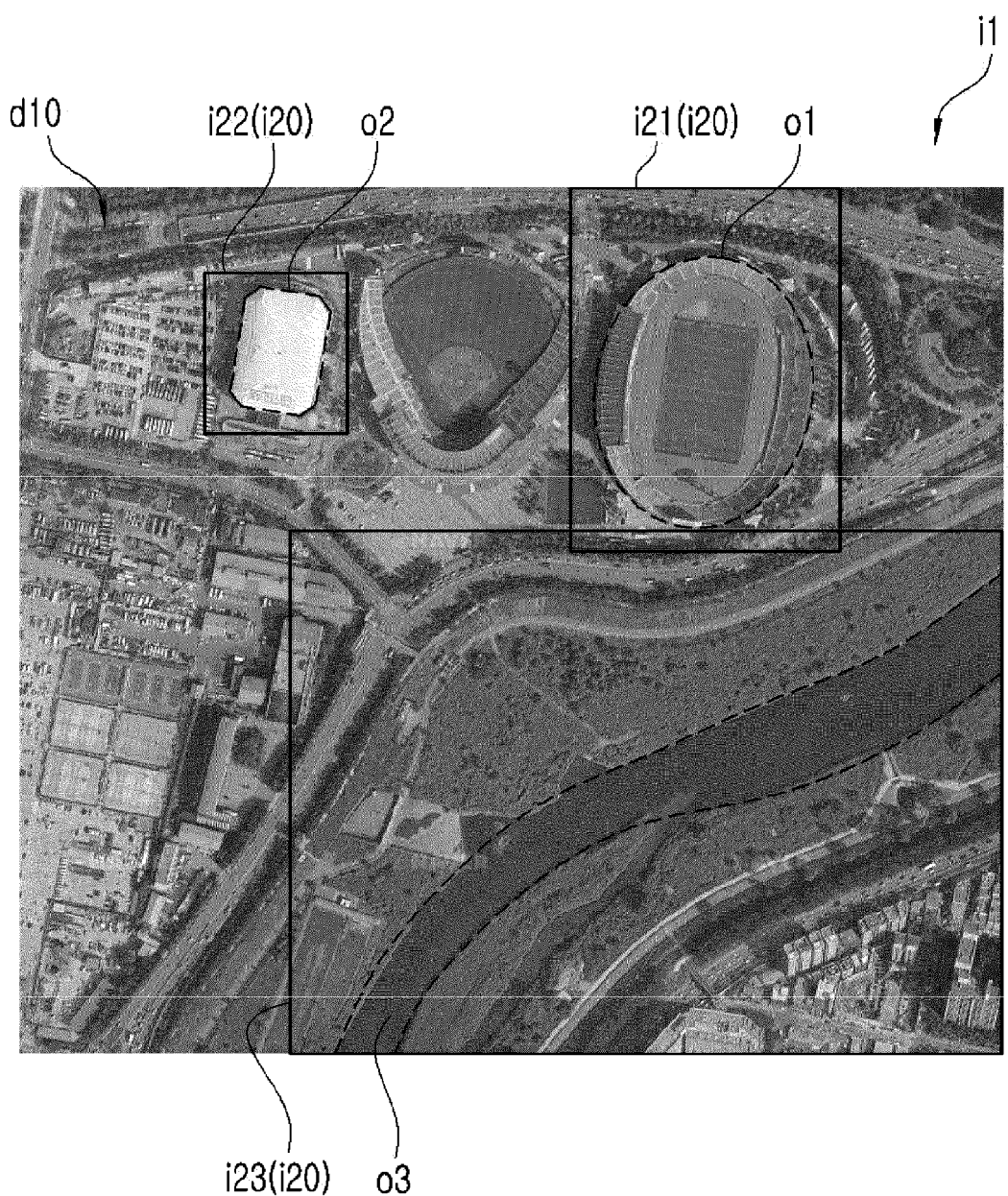
FIG. 2 illustrates an example of describing an operation of an object extractor according to an example embodiment.

FIG. 2 illustrates an example of describing an operation of an object extractor according to an example embodiment. Although a satellite image (i1) is illustrated in gray scale in FIG. 2, it is provided to explicitly illustrate each portion described here. The satellite image (i1) may be an image in colors.

Referring to FIG. 2, the object extractor 120 may extract at least one object, for example, objects o1, o2, and o3 (also, referred to as o1 to o3), from among at least one satellite image, for example, the satellite image (i1), captured from at least one area, for example, an area d10. Each of the extracted objects (o1 to o3) may refer to a target that may draw interest of the user in the area (d10). Here, the at least one area (d10) may include a main area on the ground, for example, a military installation, a disaster area, an urban area, a forecast area, a mineral resource area, and the like. The at least one object (o1 to o3), for example, may include land or fixtures on land and may include movable objects (hereinafter, a moving body), such as animals (which may include mammals, birds, fish, etc.), cars, airplanes, and ships. Land or fixtures on land may include, for example, agricultural land, green fields, forests, coastlines, roads, buildings, marinas, airports, borders, demilitarized zones, or other facilities (e.g., various facilities such as telecommunications or military installations) installed in at least one thereof. In detail, referring to FIG. 2, the at least one object may include the objects o1 and o2 corresponding to stadiums and the object o3 corresponding to the river. In addition, the at least one object (o1 to o3) may include various natural objects and/or artificial objects defined by a user, a designer, or preset settings.

The object extractor 120 may extract at least one object (o1 to o3) from the at least one satellite image (i1) or may generate and acquire information corresponding to the extracted at least one object (o1 to o3) based on the preset settings or a request from a service provider or the user. Here, the service provider may include a person that constructs a service based on satellite images (i10 and i11 of FIG. 3) stored in the storage 140 and commercially or non-commercially provides the service to another user. The user may include a person that constructs a service based on the satellite images (i10 and i11) stored in the storage 140 and directly uses the constructed service, or a person that uses a satellite image providing service from a manager or the service provider.

Referring again to FIG. 1, the object extractor 120 may include an image analyzer 121 and an object determiner 122, and, if necessary, may further include an object image generator 123.

The image analyzer 121 may analyze the satellite image (i1) and may recognize and detect a portion corresponding to each object (o1 to o3). For example, the image analyzer 121 may detect a portion determinable as any of the objects (o1 to o3) by extracting at least one feature point and/or extracting an edge surrounding the objects (o1 to o3) from the satellite image (i1). If necessary, the image analyzer 121 may acquire at least one district from the satellite image (i1) from which at least one object (o1 to o3) is to be extracted, and may extract the at least one object (o1 to o3) from the extracted each corresponding district. Depending on example embodiments, the image analyzer 121 may extract at least one object (o1 to o3) based on a target of interest predetermined by the user or the designer. The target of interest refers to a target to which the user pays a special interest. For example, the target of interest may be land, a fixture on land, or a moving body. In this case, the image analyzer 121 may extract the objects (o1 to o3) by detecting a portion corresponding to a shape of the target of interest in the satellite image (i1). The detection result of the image analyzer 121 may be forwarded to the object determiner 122 and also may be forwarded to the object image generator 123.

The object determiner 122 may determine and classify the extracted objects (o1 to o3) based on the analysis result of the image analyzer 121. For example, when the object of extracted by the image analyzer 121 corresponds to a shape of a stadium, the object determiner 122 may determine and classify the extracted object o1 as the stadium and may store a determination result in the storage 140. Likewise, when the object o3 extracted by the object determiner 122 is determined as the river, the object determiner 122 may determine the extracted object o3 as the river and may store the determination result. The determination result may be forwarded to the object image generator 123 and may be forwarded to the additional information processing 130 depending on example embodiments.

According to an example embodiment, the image analyzer 121 and the object determiner 122 may perform extraction and determination of the objects (o1 to o3) using a machine learning algorithm. Here, the machine learning algorithm may include at least one of a deep neural network (DNN), a convolutional neural network (CNN), a recurrent neural network (RNN), a convolutional RNN (CRNN), a multilayer perceptron (MLN), a deep belief network (DBN), and deep Q-networks.

Referring to FIG. 1, the image analyzer 121 and the object determiner 122 may operate sequentially or simultaneously as designed. In the latter case, for example, the image analyzer 121 may extract a feature point or a boundary from the satellite image (i1) and, at the same time, determine a type of an object (o1 to o3) corresponding thereto.

In response to the image analyzer 121 failing in extracting a suitable object (o1 to o3) from the satellite image (i1) and/or the object determiner 122 failing in determining a portion extracted from the satellite image (i1), the image analyzer 121 and the object determiner 122 may perform analysis and may record the failure in determining or analyzing the object (o1 to o3). The manager of the application service providing apparatus 100, the user, or the service provider may classify the objects (o1 to o3) from the satellite image (i1) directly or through a separate terminal, for example a terminal 90 of FIG. 5, or may determine and classify the extracted objects (o1 to o3) and may input an extraction result or a determination result.

The object image generator 123 may generate at least one image (i20: i21 to i23, hereinafter, also referred to as an object image) corresponding to the extracted or determined at least one object (o1 to o3). In detail, for example, the object image generator 123 may generate the at least one object image (i20: i21 to i23) by acquiring an image of a district in a predetermined range including the extracted at least one object (o1 to o3) from the satellite image (i1), or by acquiring, from the satellite image (i1), an image of a portion of an inner boundary of the at least one object (o1 to o3) acquired according to an analysis result of the image analyzer 121. If necessary, the object image generator 123 may generate a boundary line (hereinafter, an object classifying line) between each object (o1 to o3) and therearound by performing additional image processing on a boundary of each object (o1 to o3) of at least one object image (i20: i21 to i23). For example, the object image generator 123 may also generate an object classifying line by adding an image, such as a dot or a line, along the boundary of each object (o1 to o3) extracted by the image analyzer 121. The object classifying line supports the user to visually further clearly verify each object (o1 to o3).

The object image (i20) generated by the object image generator 123 may be forwarded to and stored in the storage 140. If necessary, at least one of an analysis result of the image analyzer 121 and a determination result of the object determiner 122 may be forwarded to and stored in the storage 140. Depending on example embodiments, the object image (i20) may be forwarded to the additional information processing 132.

The additional information processing 130 may gather information (hereinafter, additional information) associated with each object (o1 to o3) and may store the gathered additional information to correspond to the object image (i20) corresponding to each object (o1 to o3). Depending on example embodiments, the additional information processing 130 may also gather and record additional information corresponding to the satellite image (i1).

The additional information may include texts, still images, moving pictures, and/or voice. The additional information may be diversified based on the detected object (o1 to o3). In detail, for example, if the corresponding object (o1 to o3) is a field or a farm, additional information corresponding thereto may include an area or cultivated products. Also, if the corresponding object (o1 to o3) is an apartment complex or a building, additional information corresponding thereto may include the year of occupancy, a number of occupant houses, a number of occupants, a selling price, and/or a number of parking vehicles. If the corresponding object (o1 to o3) is a park, additional information corresponding thereto may include an area, opening hours, an average number of visitors, a number of visitors per time zone, and/or facilities of the park. If the corresponding object (o1 to o3) is a green field, additional information corresponding thereto may include an area and/or land use. Also, if the corresponding object (o1 to o3) is a road, additional information corresponding thereto may include a length, a direction, a year of opening, a number of floating vehicles, parking availability, and/or a number of vehicles used by time of day. Also, if the corresponding object (o1 to o3) is river, additional information corresponding thereto may include a length of river, a width of river, a flowrate of river, a coefficient of river regime, and/or depth of river.

According to an example embodiment, the additional information processing 130 may include an additional information acquirer 131 and an additional information combiner 132.

The additional information acquirer 131 may receive the determined at least one object (o1 to o3) from the object determiner 122 or the storage 140, and may gather and acquire the additional information associated therewith based on the received at least one object (o1 to o3). In this case, to acquire additional information further associated with the at least one object (o1 to o3), the additional information acquirer 131 may further receive satellite image information and may further use information (e.g., information about an observation area) included in the satellite image information. The additional information acquirer 131 may acquire the additional information by accessing an Internet network through a communication module, and by retrieving, classifying, and selecting information associated with the at least one object (o1 to o3) over an Internet network. Also, the additional information acquirer 131 may acquire additional information in response to a direct input of data from a user, a designer a service provider, and/or a manager. The additional information acquirer 131 may receive data through a manipulation using a keyboard and the like of the terminal 90 or may receive the data including additional information by exchanging data with a separately constructed database.

The additional information combiner 132 may combine the detected additional information with the object image (i20) corresponding to the additional information through tagging or mapping. Accordingly, if at least one of the satellite image (i1) and the object image (i20) is called, the additional information may be called with at least one of the satellite image (i1) and the object image (i20). Therefore, when providing the satellite image (i1) or the object image (i20), additional information corresponding to each object (o1 to o3) may be provided together. The additional information may be forwarded to and stored in the storage 140. In this case, information (e.g., tagging information or mapping information) about the object image (i20) corresponding to the additional information may be stored in the storage 140.

Figure 3:
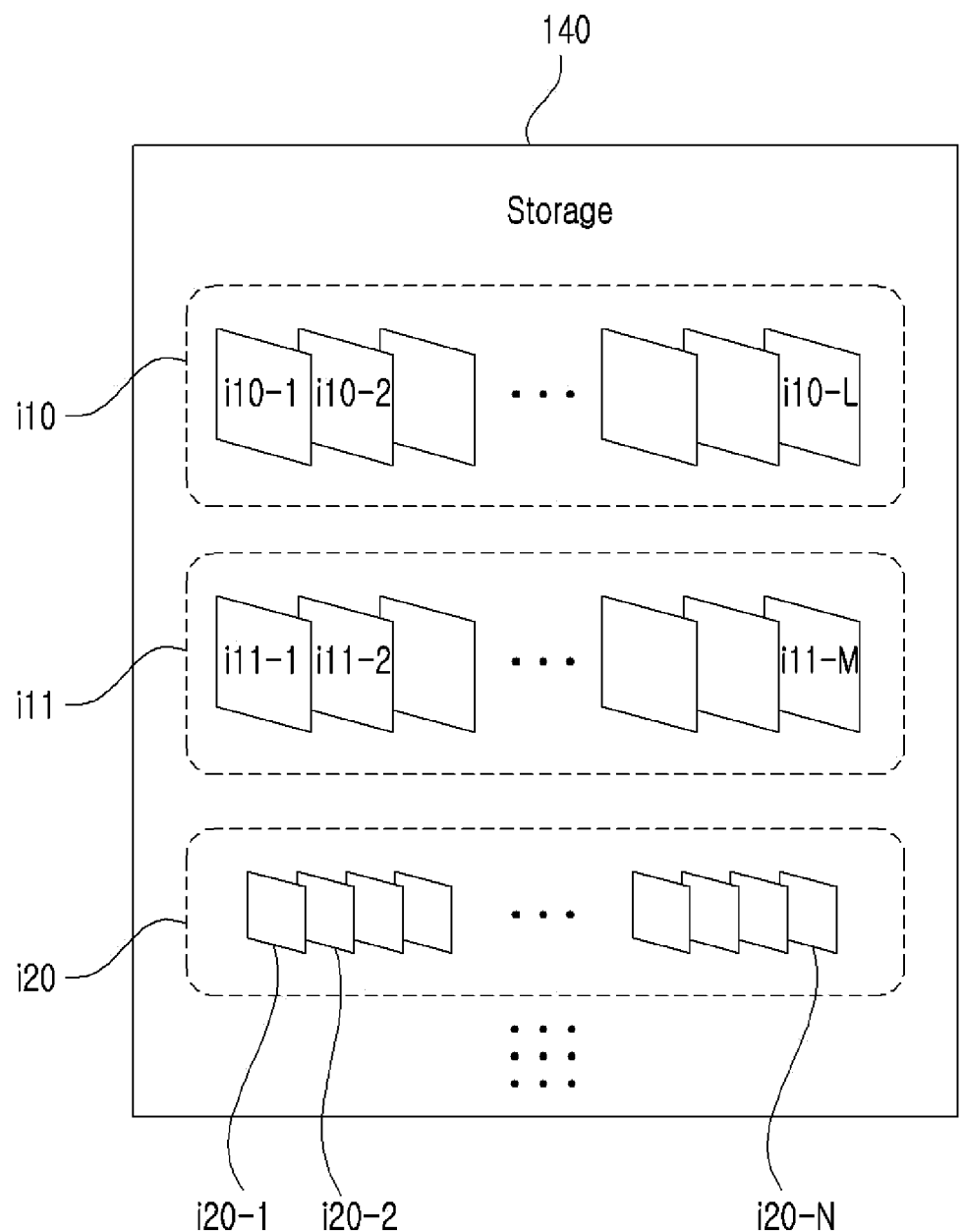
FIG. 3 illustrates an example of data stored in a storage according to an example embodiment.

FIG. 3 illustrates an example of data stored in a storage according to an example embodiment.

Referring to FIG. 3, the storage 140 may transitorily or non-transitorily store data. For example, the storage 140 may store satellite images (i10: i10-1 to i10-L, i11: i11-1 to i11-M) acquired by the satellite image information acquirer 110. Each of L and M denotes a natural number greater than or equal to 1. Also, the storage 140 may store object images (i20: i20-1 to i20-N) extracted by the object extractor 120 and may also store a determination result of the object images (i20: i20-1 to i20-N). Here, N denotes a natural number greater than or equal to 1. If necessary, the storage 140 may also store a variety of information (e.g., a captured time, an observation satellite, and/or an observation area) corresponding to the satellite images (i10, i11).

The storage 140 may categorize and thereby store at least one of the satellite images (i10, i11) and the object images (i20) based on a predetermined or a post-added classification standard.

For example, the satellite images (i10, i11) and/or the object images (i20) may be classified and categorized based on a capturing area (d10) and thereby stored. In this case, the satellite images (i10-1 to i10-L) and/or the object images (i20-1 to i20-N) captured at different points in times with respect to the same area (d10) may be grouped into a single category, area (d10), and thereby stored. According to an example embodiment, in the case of categorizing based on the area (d10), the satellite images (i10, i11) and/or the object images (i20) may be classified and categorized based on a detailed unit, such as, a continental unit (e.g., the Eurasian continent, the Americas continent or the African continent, etc.), a country unit and/or a city, province, district, town, and the like.

As another example, the satellite images (i10-1 to i10-L, i11-1 to i10-M)) and/or the object images (i20) may be classified based on the use of the area (d10) or the object (o1 to o3) and thereby stored.

As another example, the satellite images (i10, i11) and/or the object images (i20) may be classified based on the use of the area (d10) or the objects (o1 to o3) and thereby stored. For example, the satellite images (i10, i11) or the object images (i20) may be classified and categorized based on an agricultural area, an industrial area, a residential area, and a green area.

A result of classifying the satellite images (i10, i11) and/or the object images (i20) may be stored based on metadata. For example, the metadata may be generated to include a classification result of each of satellite images (i10, i11) for each of the satellite images (i10, i11) and/or each of the object images (i20). As another example, the metadata may be generated to include all of the information about each of the satellite images (i10, i11) and/or the object images (i20). Depending on example embodiments, each of the satellite images (i10, i11) and/or the object images (i20) may be classified and stored in a different memory area or a different directory based on the classification result.

The satellite images (i10, i11) and/or the object images (i20) may be hierarchically stored. For example, the storage 140 may independently store the satellite images (i10, i11) or may combine and thereby store the satellite images (i10, i11) and the object images (i20). Also, the storage 140 may combine and thereby store the satellite images (i10, i11), the object images (i20) and the additional information.

According to an example embodiment, the storage 140 may include at least one of a main memory device and an auxiliary memory device. The main memory device may be implemented using a semiconductor storage medium such as read only memory (ROM) and/or random access memory (RAM). In general, ROM may include typical ROM, erasable programmable read only memory (EPROM), electrically EPROM (EEPROM), and/or mask ROM, and RAM may include dynamic random access memory (DRAM) and/or static RAM (SRAM). The auxiliary memory device may include at least one storage media capable of permanently or semi-permanently storing data, such as, for example, a flash memory device, a secure digital (SD) card, a solid state drive (SSD), a hard disc drive (HDD), a magnetic drum, optical media such as a compact disc (CD), a DVD, or a laser disc, a magnetic tape, a magneto-optical disc, and/or a floppy disc.

Referring to FIG. 1, the service processing 150 may process at least one service (hereinafter, also referred to as a satellite image providing service) based on at least one of the satellite images (i10, i11) and the object images (i20) stored in the storage 140.

Figure 4:
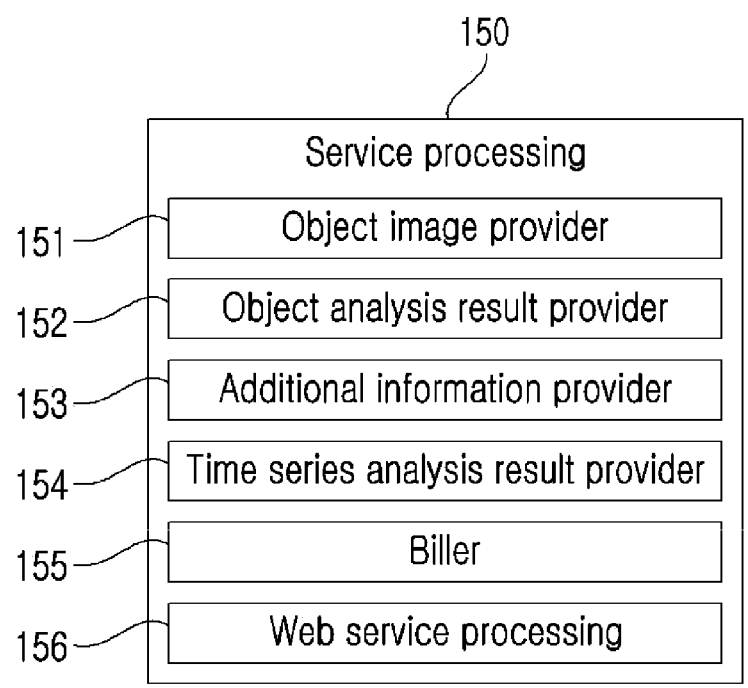
FIG. 4 is a diagram illustrating an example of a service processing according to an example embodiment.

FIG. 4 is a diagram illustrating an example of a service processing according to an example embodiment.

The service processing 150 may perform processing required to provide at least one service to a user. For example, the service processing 150 may perform operation and control processing required for an operation of a service, may output an electrical signal corresponding to an operation and control result, or may receive data required for operation and control from an outside.

Referring to FIG. 4, the service processing 150 may include components to perform the respectively different services, for example, an object image provider 151, an object analysis result provider 152, an additional information provider 153, a time series analysis result provider 154, a biller 155, and/or a web service processing 156. However, it is provided as an example only and the service processing 150 may further include at least one component configured to implement, process, and provide various services. Here, at least one of the components (151 to 156) may be omitted.

Each of the components (151 to 156) may be configured as at least one application. If necessary, each of the components (151 to 156) may be configured as a different physical device (e.g., a processor) and an application installed thereon.

According to an example embodiment, a user or a service provider may further add, to the service processing 150, at least one component corresponding to a service to use or provide. In this case, the service provider may add the component to the service processing 150 by installing an application for performing the service. The application may be added to the service processing 150, for example, in a plug-in form.

Figure 5:
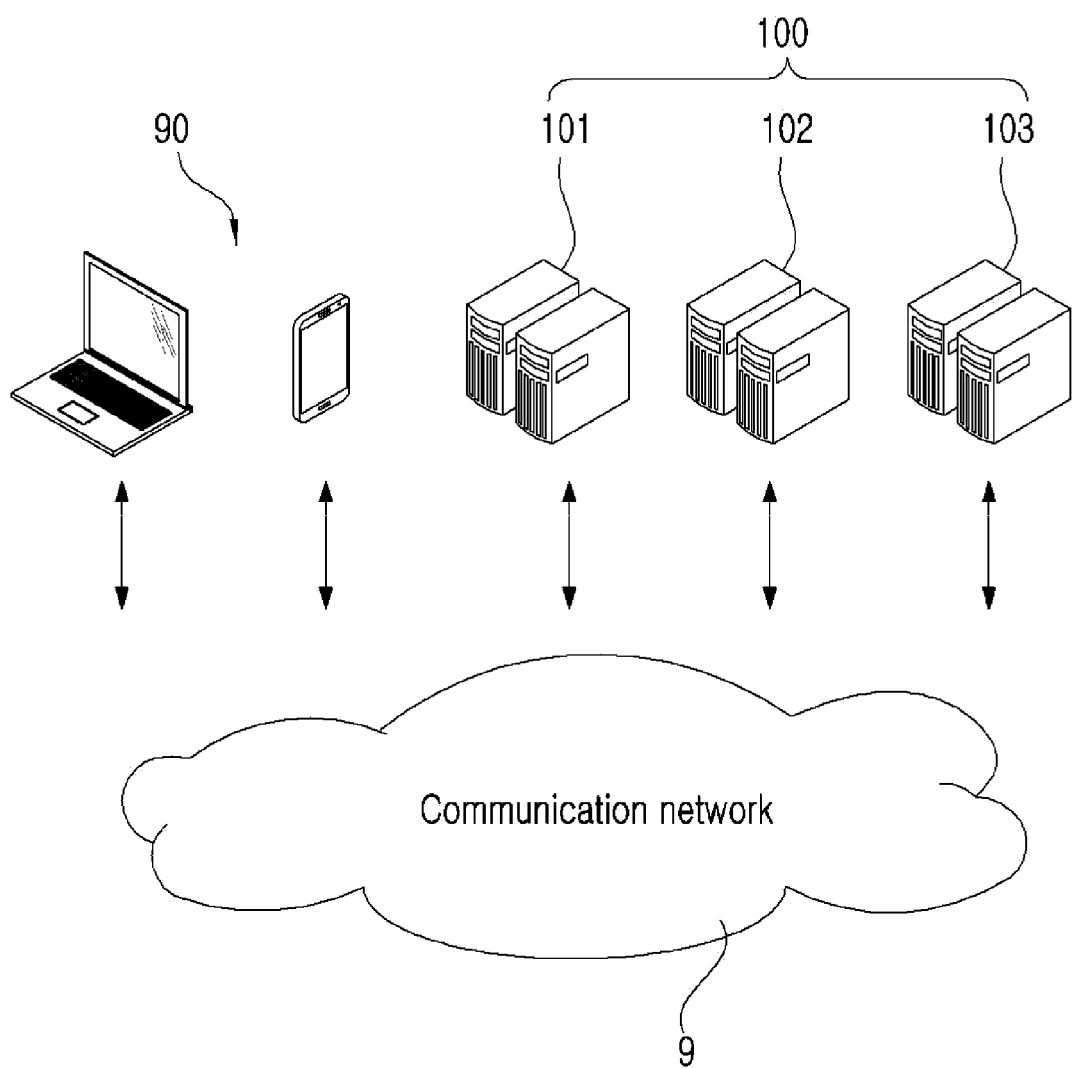
FIG. 5 illustrates an example of describing an application service using a satellite image according to an example embodiment.

FIG. 5 illustrates an example of an application service providing process using a satellite image according to an example embodiment.

Referring to FIG. 5, the object image provider 151 may provide an object image to a user through a system (hereinafter, an application service providing system) for providing an application service using a satellite image.

Referring to FIG. 5, the application service providing system may include at least one terminal 90 and the application service providing apparatus 100 capable of exchanging data with the at least one terminal 90 over a communication network 9.

The at least one terminal 90 may include a device capable of communicating with the application service providing apparatus 100 and inputting and outputting required information. The terminal 90 may be specially designed for use of the satellite data providing apparatus 100, or may be a known information processing device. The information processing device may include at least one of, for example, a laptop computer, a desktop computer, a smartphone, a tablet personal computer (PC), a smart watch, a digital television, a set-top box, a navigation device, an artificial intelligence speaker, a portable game device, a head mounted display (HMD) device, an electronic notepad, an electronic copy board, an electronic billboard, an electronic device, and/or various electronic devices capable of performing input of a symbol or visual/auditory output of data.

The terminal 90 may receive data from the application service providing apparatus 100 using an existing web browser or a specially designed separate application or may forward the necessary information to the application service providing apparatus 100. Here, the specially designed separate application may be provided or updated from the application service providing apparatus 100 or through an electronic software distribution network.

The application service providing apparatus 100 may perform a satellite image providing service. As described above with reference to FIG. 1, the application service providing apparatus 100 may acquire satellite image information including the satellite images (i1, i10, i11) and may store the acquired satellite images (i1, i10, i11), and may also generate and store the object images (i20) by processing the acquired satellite images (i1, i10, i11), or may acquire additional information corresponding to the satellite images (i1, i10, i11) or the object images (i20) and may add, to the satellite images (i1, i10, i11) and the object images (i20), and thereby store the acquired additional information.

According to an example embodiment, the application service providing apparatus 100 may include at least one information processing device that is communicably interconnected. For example, referring to FIG. 5, the application service providing apparatus 100 may include a main server device 101 configured to perform a variety of processing, such as acquiring the object images (i20) or additional information, a database server device 102 configured to perform the functionality of the storage 140 by storing the satellite images (i1, i10, i11), the object images (i20), and/or additional information, and a web server device 103 configured to perform the functionality of the web service processing 156 by providing a web service. However, it is provided as an example only. The application service providing apparatus 100 may be configured based on a greater or smaller number of information processing devices than a number of information processing devices shown in FIG. 5.

The communication network 9 may include a wired communication network, a wireless communication network, or a combination thereof. Here, the wired communication network may be constructed using a cable, for example, a pair cable, a coaxial cable, an optical fiber cable, and an Ethernet cable. The wireless communication network may be implemented using at least one of a near field communication network and a long distance communication network. The near field communication network may be implemented using, for example, wireless fidelity (WiFi), WiFi direct, Bluetooth, Bluetooth low energy (BLE), Zig-Bee, and near field communication (NFC), and control area network (CAN) communication. The long distance communication network may be implemented based on a wired communication network, for example, a mobile communication standard such as 3rd Generation Partnership Project (3GPP), 3GPP2, Worldwide Interoperability for Microwave Access (WiMAX), and the like.

Figure 6:
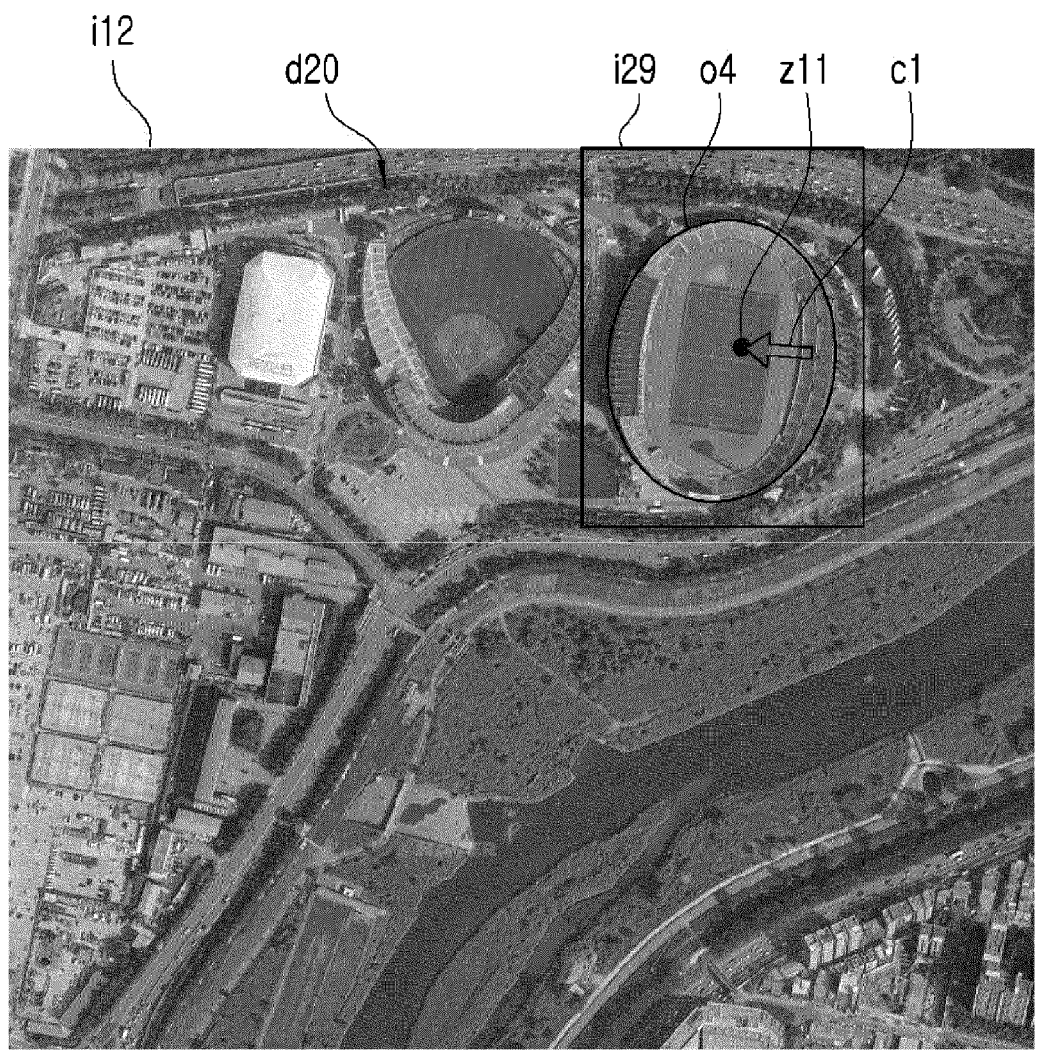
FIG. 6 illustrates an example of a process of providing an object image corresponding to a target of interest according to an example embodiment.

FIG. 6 illustrates an example of a process of providing an object image corresponding to a target of interest according to an example embodiment.

The object image provider 151 may provide the acquired object image (i29) to the user using the application service providing system 1. For example, in response to the user accessing the application service providing apparatus 100 by controlling the terminal 90, the object image provider 151 may receive information about a target of interest and, referring to FIG. 6, may provide the user with an object image (i29) of an object o4 corresponding to the received target of interest.

In detail, for example, in response to the user inputting a service use request through the terminal 90, the terminal 90 may forward the service use request to the object image provider 151. Also, the terminal 90 may forward information about a desired area (d20, hereinafter, a region of interest (ROI)) desired by the user to the object image provider 151. In this case, the web service processing 156 may also be used. In response to receiving information about the ROI (d20), the object image provider 151 may transmit a satellite image (i12) corresponding to the ROI (d20) to the terminal 90. The user may read the satellite image (i12) through the terminal 90, and may select a target of interest (e.g., a road, a building, a green field, a vehicle, a ship, etc.) of the ROI (d20) from the satellite image (i12). A target of interest may be selected by touching a single point (z11) of the target of interest, by directing to and clicking on a single point (z11) of a cursor (c1), and/or moving and selecting a focus using a keyboard device. In response to a selection from the user on the target of interest, the terminal 90 may forward information about the selected target of interest to the object image provider 151. In response to receiving the target of interest, the object image provider 151 may acquire the object image (i29) of the object (o4) corresponding to the target of interest from the storage 140 and may forward the acquired object image (i29) to the terminal 90. The terminal 90 may output the received object image (i29) to the user. The user may verify the output object image (i29) and may verify a detection accuracy of the detected object (o4). The detection accuracy may include a degree of matching between the extracted object (o4) and the target of interest. The user may determine whether to use a corresponding service based on the detection accuracy and may forward a determination result to the object image provider 151. The object image provider 151 may periodically or aperiodically provide at least one of the satellite image (i12) and the object image (i29) to the user based on a determination result of the user. The determination result of the user may be forwarded to the biller 155. The biller 155 may determine whether to perform charging based on the determination result of the user and may perform charging.

Accordingly, the application service providing system 1 and the application service providing apparatus 100 may extract and provide the requested target of interest for the area (d20) requested by the user without restriction on a time. The user may verify the extraction result, that is, the object image (i29) and may use the object image (i29) or perform another task based on the object image (i29).

Figure 7:
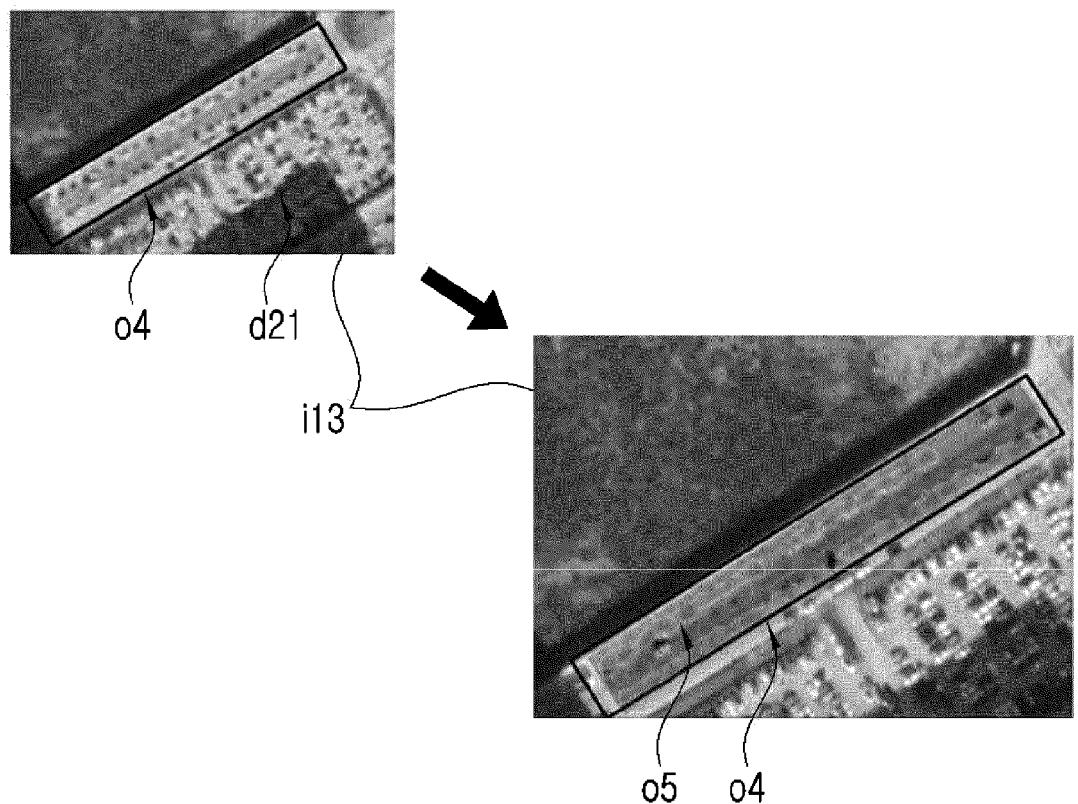
FIG. 7 illustrates an example of a process of providing a result of analyzing an object corresponding to a target of interest according to an example embodiment.

FIG. 7 illustrates an example of a process of providing a result of analyzing an object corresponding to a target of interest according to an example embodiment.

Referring to FIG. 7, the object analysis result provider 152 may analyze objects (o4, o5) extracted from a satellite image (i13) and may provide an analysis result to the user. In detail, the object extractor 120 may detect a specific object (o4), for example, a road, from the satellite image (i13) corresponding to a predetermined area (d21). Also, the object extractor 120 may further detect another object (o5), for example, a vehicle, in a specific object (o4). Accordingly, a plurality of different objects, that is, the road (o4) and the vehicle (o5) may be detected. The object analysis result provider 152 may perform analysis in response to a request from the user based on the detected objects (o4, o5), may acquire an analysis result, and may transmit the analysis result to the terminal 90. For example, the object analysis result provider 152 may detect a single object, for example, the road (o4), and detect another object, for example, the vehicle (o5) present on the road (o4), may calculate a number of the vehicles (o5) on the road (o4), and may transmit the calculation result to the terminal 90. Also, the object analysis result provider 152 may generate an analysis result based on images detected at different points in times or present in adjacent areas. For example, an object, for example, the number of vehicles (o5), detected at a first point in time and an object, for example, a number of vehicles (o5), detected at a second point in time may be calculated and a difference therebetween may be acquired. In this manner, a change in the number of vehicles (o5) between the first point in time and the second point in time may be analyzed.

The additional information provider 153 may provide the user with additional information about a target of interest desired by the user. In detail, the additional information provider 153 may provide the satellite image (i11) to the user, and may transmit additional information corresponding to a target of interest to the terminal 90 in response to a selection from the user on at least one target of interest in the satellite image (i11) through a touch or a mouse control and thereby may provide the user with the additional information. In this case, the object images (i20, i29) of the objects (o1 to o4) corresponding to the at least one target of interest may be transmitted to the terminal 90 of the user. According to an example embodiment, the additional information provider 153 may determine the objects (o1 to o4) corresponding to the at least one target of interest, may extract additional information corresponding to the objects (o1 to o4) from the storage 140, and may acquire the additional information to be provided to the user. In this case, the additional information provider 153 may use or may not use the images (i20, i29) corresponding to the objects (o1 to o4) to extract the additional information.

Figure 8:
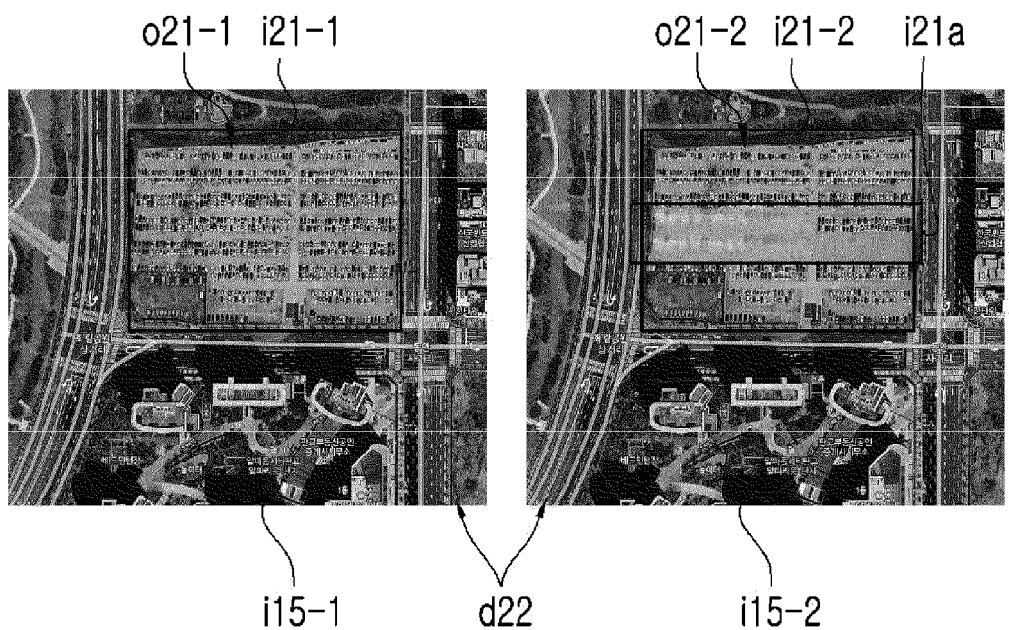
FIG. 8 illustrates an example of a process of providing a result of comparing and analyzing objects according to an example embodiment.

FIG. 8 illustrates an example of a process of providing a result of comparing and analyzing objects according to an example embodiment.

Referring to FIG. 8, the time series analysis result provider 154 may detect a change in satellite images (i15-1, i15-2) or objects (o21-1, o21-2) over time. In detail, the time series analysis result provider 154 may receive, from the storage 140, a plurality of satellite images, for example, two satellite images (i15-1, i15-2), captured at different points in times with respect to the identical or an adjacent area (d22), and may detect a difference between the two satellite images (i15-1, i15-2). In this case, the difference between the two satellite images (i15-1, i15-2) may be detected by matching the two satellite images (i15-1, i15-2) and by acquiring a differential image about two satellite images (i15-1, i15-2). Also, the time series analysis result provider 154 may receive, from the storage 140, the object images (i21-1, i21-2) acquired from the satellite images (i15-1, i15-2) captured at different points in times, respectively, and may detect a difference (i21a) between the object images (i21-1, i21-2). Here, objects (o21-1, o21-2) respectively corresponding to the object images (i21-1, i21-2) may be determined based on a target of interest input from the user or a provider. Likewise, the difference (i21a) between the object images (i21-1, i21-2) may be acquired through a matching and differential image acquiring process. Accordingly, a change in each of the object images (o21-1, o21-2) over time may be verified. Through this, the user may further conveniently perform various types of time series analysis, such as a city change management, an analysis of a disaster situation, an analysis about a road combustion situation, and/or an analysis about economic growth of a specific area such as a city or a country.

A change detection accuracy of the time series analysis result provider 154 is easily affected by performance of a classification method of the satellite images (i1, i11 to i14, i15-1, i15-2). In the case of a current middle/low resolution satellite image, the distribution range of spectral information expands and various spectral properties appear even for the same object. Therefore, for effective change detection of the time series analysis result provider 154, the image analyzer 121 may further clearly detect an object using a method of removing colors in the satellite images (i1, i11 to i14, i15-1, i15-2) one by one using a filter and the like. Accordingly, the time series analysis result provider 154 may further accurately and quickly detect the change.

The biller 155 may determine whether to charge for use of the application service providing system 1, or may calculate cost (e.g., a service charge) and perform payment request and processing for the calculated cost. The biller 155 may perform calculation, billing, and/or payment using various methods based on a selection of the user or the designer. The biller 155 may perform charging in real time based on a selection of the user or a preset setting and may also perform charging based on a predetermined period (e.g., day, week, or month). The biller 155 may perform charging per request for the object image (i20) or may perform charging based on a predetermined period according to a predetermined amount. Also, the biller 155 may differently calculate cost and may charge based on a type of a service being used. For example, the biller 155 may differently calculate cost for a service of providing the object image (i20) and cost for a service of providing a comparison result.

According to an example embodiment, the biller 155 may determine whether to charge the user based on a determination to use an application service using a satellite image input from the user through the terminal 90. For example, when the user determines that an appropriate target of interest is extracted from the satellite image (i1, i10, i11) and determines to use a service, the biller 155 may determine to charge the user.

The web service processing 156 may perform processing such that the user may access the application service providing apparatus 100 through a web and may use an application service using a satellite image. In detail, the web service processing 156 may provide the user with a user interface for receiving an instruction or data from the user and/or providing the user with the satellite image (i1, i10, i11) or the object image (i20) through the terminal 90. Also, the web service processing 156 may process a user authentication based on unique user identification information (e.g., a customer ID) or an authentication code (e.g., a password) assigned to each user. Also, the web service processing 156 may receive, from the terminal 90, a verification result of the object image (i20), an evaluation thereof, or a determination result regarding whether to use a service. The determination result regarding whether to use a service may be forwarded to the biller 155. Also, the web service processing 156 may perform various types of statistical processing associated with the user. According to an example embodiment, the web service processing 156 may be configured using the web server device 103.

The satellite image information acquirer 110, the object extractor 120, the additional information processing 130, and the service processing 150 may be configured using at least one processor. The processor may include, for example, a central processing unit (CPU), a micro controller unit (MCU), a microprocessor (Micom), an application processor (AP), an electronic controlling unit (ECU), and/or information processing devices capable of performing various types of operation processing and generating a control signal.

The processor may be configured to perform the aforementioned operation, determination, processing and/or control operations by executing an application stored in the storage 140. Here, the application may be generated by the designer and input to the storage 140, or may be acquired or updated through an electronic software distribution network accessible over a wired or wireless communication network.

When the satellite image information acquirer 110, the object extractor 120, the additional information processing 130, and the service processing 150 are configured using a plurality of processors, each processor may be installed on a single information processing device or may be installed on each of at least two information processing devices. Here, the information processing device may be configured using at least one of a server computer device, a desktop computer, a laptop computer, and other various electronic devices capable of performing information processing.

Hereinafter, an example of a method of providing an application service using a satellite image according to an example embodiment is described with reference to FIG. 9.

Figure 9:
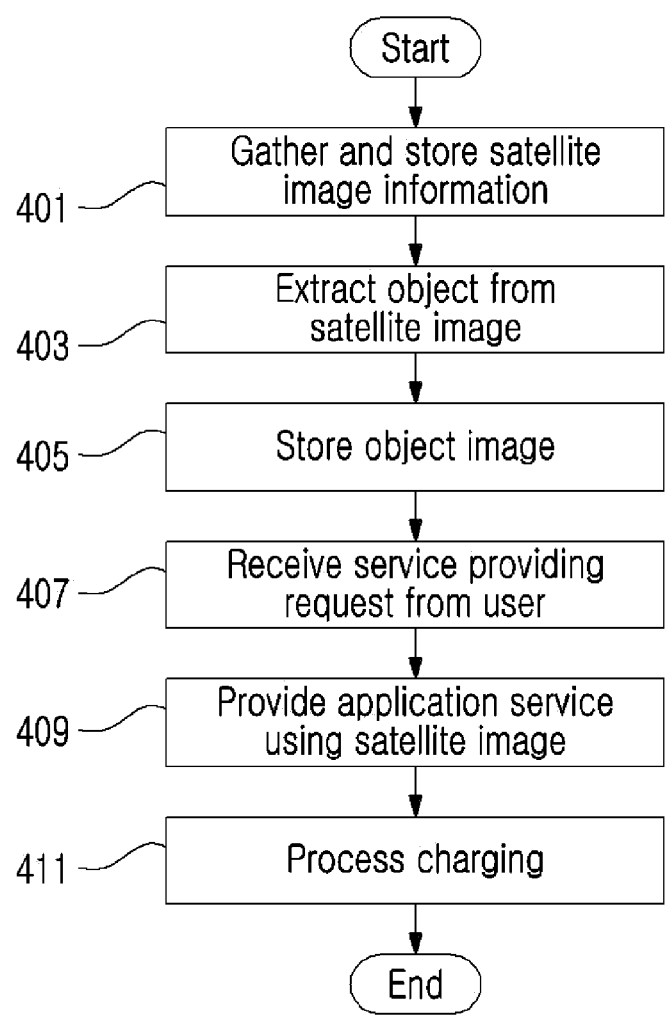
FIG. 9 is a flowchart illustrating an example of a method of providing an application service using a satellite image according to an example embodiment.

FIG. 9 is a flowchart illustrating an example of a method of providing an application service using a satellite image according to an example embodiment.

Referring to FIG. 9, in operation 401, satellite image information may be gathered. The satellite image information may include a satellite image in a form of a still image or a moving picture, and may include a variety of information associated with the satellite image, for example, a capturing area, a captured time, a capturing artificial satellite or resolution, and the like. The satellite image information may be gathered from at least one of an artificial satellite, another information storage device of a space ground station connected to the artificial satellite, and other data storage devices. The gathered satellite image information may be stored in a storage.

In operation 403, once the satellite image is gathered, an object may be extracted from the satellite image based on a preset setting or in response to a request from a user or a provider. In detail, a specific portion may be detected by performing an image analysis of the satellite image and the detected portion may be determined as a specific object. In detail, a feature point or a boundary may be extracted/detected from the satellite image, and a specific feature may be detected and determined based on the feature point or the boundary. The aforementioned image analysis and object detection may be performed using a machine learning algorithm.

In operation 405, once the object is extracted from the satellite image, an object image corresponding to the object may be generated and stored. The object image may include only the object and may include the object and a surrounding of the object.

Depending on example embodiments, additional information corresponding to the object may be acquired with at least one of the object extracted in operation 403 and the object image generated in operation 405. The additional information may be acquired from an Internet network or a separate storage device. The acquired additional information may be stored and may be stored through tagging to the satellite image, the generated object or the generated object image, depending on example embodiments.

Through the aforementioned process (401 to 405), the satellite image, the object image and/or additional information added thereto may be stored in a predetermined storage. In this case, the satellite image, the object image and/or the additional information added thereto may be classified and categorized based on a predetermined classification standard and thereby stored in the storage. The classification standard may include at least one of a capturing area, a captured time, and a capturing purpose. Depending on example embodiments, the satellite image, the object image and/or additional information may be hierarchically stored. A result of classifying and categorizing the satellite image, the object image and/or additional information may be stored using metadata. If necessary, such a classification and categorization result may be applied by changing a storage area of each image or additional information for each classification/category.

In operation 407, a service providing request may be received from a user based on the satellite image, the object image and/or additional information. In this case, the user may select and request at least one service providable from an application service providing apparatus using the satellite image.

In operation 409, in response to the request for providing the service, the application service using the satellite image may be provided. The application service using the artificial image may include, for example, a service of providing an object or an object image corresponding to a target of interest selected by the user, a service of providing an analysis result (e.g., an object coefficient result) of the object corresponding to the target of interest, a service of providing additional information of an area corresponding to a region of interest or an object corresponding to the target of interest, and/or a service of comparing satellite images captured at different points in times or object images acquired from the satellite image and providing a time series analysis result based on a comparison result. Also, depending on example embodiments, various application services using various satellite images considerable by a designer or a provider may be provided. The application service using the satellite image may be provided based on a web, depending on example embodiments.

In operation 411, cost for using the application service may be charged at the same time of or after or before providing the application service using the satellite image. Such charging may be processed using various methods based on a selection of the designer or the provider.

The application service providing method using the satellite image according to the example embodiments may be implemented in a form of a program executable by a computer apparatus. For example, the program may include, alone or in combination with program instructions, data files, data structures, and the like. The program may be designed and manufactured using a machine code or a higher level code. The program may be specially designed to implement the application service providing method and may be implemented using functions or definitions well-known and available to those skilled in the computer software arts. Also, a computer apparatus may include a processor, a memory, and the like to implement functions of the program, and, if necessary, may further include a communication apparatus.

The program for implementing the application service providing method may be recorded in non-transitory computer-readable media. Examples of the non-transitory computer-readable media may include magnetic disc storage media such as hard discs and floppy discs; optical media such as magnetic tapes, CD-ROM discs and DVDs; magneto-optical media such as floptical discs; and various types of hardware devices that are specially configured to store and perform a specific program executed in response to call of a computer, such as semiconductor storage devices, for example, ROM, RAM, flash memory, and the like.

A number of example embodiments regarding the application service providing apparatus and method using the satellite image have been described above. Nonetheless, it should be understood that various modifications may be made to these example embodiments. For example, various apparatuses or methods achieved by one of ordinary skill in the art through alterations and modifications thereto may be an example embodiment of the application service providing apparatus and method. For example, suitable results may be achieved if the described techniques are performed in a different order and/or if components in a described system, architecture, apparatus, or circuit are combined in a different manner and/or replaced or supplemented by other components or their equivalents. Accordingly, other implementations are still within the scope of the following claims.

What is claimed is:

1. An apparatus for providing an application service using a satellite image, the apparatus comprising:
a processor configured to
acquire a satellite image;
analyze the satellite image;
extract an object from the satellite image; and
generate an object image corresponding to the object; and
a storage configured to store the satellite image and the object image,
wherein the processor is further configured to process a service based on at least one of the satellite image and the object image,
wherein the service comprises at least one of:
a service of providing an object image corresponding to a target of interest;
a service of providing a result of analyzing an object corresponding to the target of interest;
a service of providing additional information corresponding to an area corresponding to a region of interest or the object corresponding to the target of interest; and
a service of providing a result of analyzing a difference between a plurality of satellite images captured at different times or a result of performing a time series analysis on a difference between a plurality of object images acquired from the plurality of satellite images,
wherein the processor is further configured to provide, to a user terminal, a detection accuracy including a degree of matching between the extracted object and the target of interest,
wherein the processor is further configured to
determine whether the extracted object is a field or a farm, and
when it is determined that the extracted object is the field or the farm, provide the additional information including an area or cultivated products, of the field or the farm,
wherein the processor is further configured to
determine whether the extracted object is an apartment complex or a building, and
when it is determined that the extracted object is the apartment complex or the building, provide the additional information including at least one of a year of starting occupancy, a number of occupant houses, a number of occupants, a selling price, and a number of parking vehicles, of the apartment complex or the building,
wherein the processor is further configured to
determine whether the extracted object is a park, and
when it is determined that the extracted object is the park, provide the additional information including at least one of an area of the park, opening hours, an average number of visitors, a number of visitors per time zone, and facilities, of the park,
wherein the processor is further configured to
determine whether the extracted object is a green field, and
when it is determined that the extracted object is the green field, provide the additional information including an area or land use of the green field,
wherein the processor is further configured to
determine whether the extracted object is a road, and
when it is determined that the extracted object is the road, provide the additional information including at least one of a length, a direction, a year of opening, a number of floating vehicles, parking availability, and a number of vehicles used by time of day, of the road, and
wherein the processor is further configured to
determine whether the extracted object is a river, and
when it is determined that the extracted object is the river, provide the additional information including at least one of a length, a width, a flowrate, a coefficient of river regime, and a depth, of the river.

2. The apparatus of claim 1, wherein the processor is further configured to acquire additional information corresponding to the object, and to combine the additional information with at least one of the satellite image and the object image.

3. The apparatus of claim 1, wherein the service of providing the object image corresponding to the target of interest is performed by providing the satellite image in response to a request from the user terminal, by receiving a user selection on the target of interest in the satellite image, by providing the object image corresponding to the target of interest, and by receiving a determination regarding whether to use the service in response to providing of the object image.

4. The apparatus of claim 1, wherein the processor is further configured to analyze the satellite image or to extract the object from the satellite image, using at least one machine learning algorithm.

5. The apparatus of claim 1, wherein the processor is further configured to perform billing processing corresponding to providing of the service.

6. A method of providing an application service using a satellite image, the method comprising:
acquiring a satellite image;
analyzing the satellite image, extracting an object from the satellite image, and generating an object image corresponding to the object;
storing the satellite image and the object image; and
providing a service based on at least one of the satellite image and the object image,
wherein the providing of the service comprises at least one of:
providing an object image corresponding to a target of interest;
providing a result of analyzing an object corresponding to the target of interest;
providing additional information corresponding to an area corresponding to a region of interest or the object corresponding to the target of interest;
providing a result of analyzing a difference between a plurality of satellite images captured at different times or a result of performing a time series analysis on a difference between a plurality of object images acquired from the plurality of satellite images;
providing, to a user terminal, a detection accuracy including a degree of matching between the extracted object and the target of interest;
determining whether the extracted object is a field or a farm, and when it is determined that the extracted object is the field or the farm, providing the additional information including an area or cultivated products, of the field or the farm;
determining whether the extracted object is an apartment complex or a building, and when it is determined that the extracted object is the apartment complex or the building, providing the additional information including at least one of a year of starting occupancy, a number of occupant houses, a number of occupants, a selling price, and a number of parking vehicles, of the apartment complex or the building;
determining whether the extracted object is a park, and when it is determined that the extracted object is the park, providing the additional information including at least one of an area of the park, opening hours, an average number of visitors, a number of visitors per time zone, and facilities, of the park;
determining whether the extracted object is a green field, and when it is determined that the extracted object is the green field, providing the additional information including an area or land use of the green field;
determining whether the extracted object is a road, and when it is determined that the extracted object is the road, providing the additional information including at least one of a length, a direction, a year of opening, a number of floating vehicles, parking availability, and a number of vehicles used by time of day, of the road; and
determining whether the extracted object is a river, and when it is determined that the extracted object is the river, providing the additional information including at least one of a length, a width, a flowrate, a coefficient of river regime, and a depth, of the river.

7. The method of claim 6, further comprising:
acquiring additional information corresponding to the object, and combining the additional information with at least one of the satellite image and the object image.

8. The apparatus of claim 6, wherein the providing the object image corresponding to the target of interest comprises:
providing the satellite image in response to a request from the user terminal;
receiving a user selection on the target of interest in the satellite image;
providing the object image corresponding to the target of interest; and
receiving a determination regarding whether to use the service in response to providing of the object image.

9. The method of claim 6, wherein the analyzing of the satellite image, the extracting of the object, and the generating of the object image comprises at least one of:
analyzing the satellite image using at least one machine learning algorithm; and
extracting the object from the satellite image using the at least one machine learning algorithm.

10. The method of claim 6, further comprising:
performing billing processing corresponding to providing of the service.

11. The apparatus of claim 1, wherein the processor is further configured to receive, from the user terminal, a determination result responding to the detection accuracy, and determine, based on the received determination result, whether providing the satellite image and the object image to the user terminal periodically or aperiodically.

12. The apparatus of claim 5, wherein the processor is further configured to receive, from the user terminal, a determination result responding to the detection accuracy, and determine, based on the received determination result, whether to perform the billing processing corresponding to providing of the service.

13. The method of claim 6, further comprising:
receiving, from the user terminal, a determination result responding to the detection accuracy; and
determining, based on the received determination result, whether providing the satellite image and the object image to the user terminal periodically or aperiodically.

14. The method of claim 10, wherein the performing billing processing comprises:
receiving, from the user terminal, a determination result responding to the detection accuracy; and
determining, based on the received determination result, whether to perform the billing processing corresponding to providing of the service.

15. The apparatus of claim 1, wherein the processor is further configured to
detect, from the satellite image, vehicles at a first point in time, and vehicles at a second point in time,
calculate a difference between a number of the vehicles detected at the first point in time and a number of the vehicles detected at the second point in time, and
provide, to the user terminal, the calculated difference as a change analysis in the number of vehicles between the first point in time and the second point in time.

16. The method of claim 6, further comprising:
detecting, from the satellite image, vehicles at a first point in time, and vehicles at a second point in time;
calculating a difference between a number of the vehicles detected at the first point in time and a number of the vehicles detected at the second point in time; and
providing, to the user terminal, the calculated difference as a change analysis in the number of vehicles between the first point in time and the second point in time.

* * * * *